Patented Aug. 9, 1927.

1,638,045

UNITED STATES PATENT OFFICE.

JOHN W. LIVINGSTON, OF HAMBURG, AND LUCAS P. KYRIDES, OF BUFFALO, NEW YORK.

MANUFACTURE OF NITROBENZENE.

No Drawing.   Application filed November 27, 1922.   Serial No. 603,657.

This invention relates to an improvement in the method of manufacture and production of nitrobenzene.

It is known that nitrobenzene is usually manufactured by treating benzene with nitric acid in the presence of sulfuric acid, or with a previously prepared mixture of these acids, under carefully controlled conditions of temperature and concentration. The economic disadvantages of this method lie chiefly in the comparatively low temperatures at which the reaction is carried out, e. g. usually around 60° C., the difficulties involved in maintaining these temperatures, the comparatively long time required to complete the reaction, the hazards involved in handling nitric acid or a mixture of nitric and sulfuric acids, and the expense incurred in both the manufacture and the shipment of nitric acid.

It has been also heretofore proposed to effect the manufacture of nitrobenzene by the addition of concentrated sulfuric acid to a mixture of an alkali nitrate and a portion of the benzene to be nitrated until a layer of molten or dissolved sodium acid sulfate is formed, together with some nitrobenzene, and the temperature of the mixture has risen to about 100° C. To this mixture at this temperature there is then gradually added, with constant stirring, the remaining portion of benzene and the remaining portion of sulfuric acid. So far as we are aware, this process has never come into general commercial practice. The disadvantages of the process lie principally in the difficulty of its control, particularly in the first part of the operation, during the addition of the concentrated sulfuric acid to the mixture of nitrate and benzene. The mechanical difficulty of stirring the mass which becomes more or less semi-solid, makes it almost impossible to intimately mix it with the sulfuric acid and prevent local action which, due to sudden rise in temperature, tends to produce copious evolution of oxides of nitrogen and over nitrations, if not explosions, and consequently a lowering of yields. Furthermore, the agitation of the full charge of nitrate has a distinct erosive effect on the nitration kettle and in consequence of which the corrosive effect of the acid on the kettle is likewise increased.

The present invention is based upon the discovery that nitrobenzene may be effectively and economically produced by subjecting benzene to the action of a mixture of sodium nitrate and sulfuric acid provided suitable conditions of temperature, concentration, proportions, agitation, etc. are maintained. It has been found that by the use of a somewhat diluted sulfuric acid as the nitrating medium and at a somewhat higher initial temperature than that hitherto proposed that the nitration of the benzene takes place readily and is easily controlled. Under these conditions the nitrating medium readily dissolves the sodium nitrate and forms sodium acid sulfate which remains in solution, and permits the subsequent addition of strong sulfuric acid during the course of the reaction in order to more or less preserve, if desired, the initial strength or concentration of the nitrating medium. Moreover, the comparatively high temperature used in the process greatly facilitates the speed of the reaction and markedly decreases the time necessary to complete the reaction. It has been further found that the nitration of benzene at the beginning of the operation proceeds more smoothly and that the reaction is much easier to control if the benzene is diluted by the presence of nitrobenzene. Further, the presence of nitrobenzene in the benzene allows the nitration to be carried out from the very beginning at temperatures considerably higher than is otherwise possible.

In carrying out the process, sodium nitrate, sulfuric acid, for example, of about 90 to 100 per cent strength, and benzene are simultaneously and gradually added to a well stirred and thoroughly agitated mixture of sulfuric acid, for example, of about 70 to 85 per cent strength, nitrobenzene and benzene heated to a temperature of, say 85°–115° C., at such a rate as to maintain until near the end of the reaction a slight excess of benzene and to maintain the desired temperature throughout the reaction. The addition of the benzene and sulfuric acid may be done from calibrated tanks and the amounts added so regulated as to correspond to the proportional rate of addition of sodium nitrate. Moreover the amount of the stronger acid added to the weaker acid is such that the strength of the weaker acid is maintained throughout the course of nitration at a strength of between about 70 and 85 per cent, the strength being expressed as H₂SO₄ by titration after correcting for any nitric acid present. In this way there is at no time a violent reaction, the mixture is readily emulsified, and regular and uniform nitration takes place with minimum danger of local over-action. It is to be noted, however, that the present invention may be carried out without the initial addition of nitrobenzene to the sulfuric acid and benzene. In this case, the agitated mixture of sulfuric acid and benzene is heated to an initial temperature at or near the boiling point of benzene and as the nitrobenzene, which is formed during the process by the nitration of benzene, gradually accumulates in amount the temperature of the agitated mixture is gradually raised to the desired point, for example, 85°–115° C.

The following specific example will further illustrate the invention, but it is understood that the invention is not limited thereto. The parts are by weight. Example: A well-stirred mixture of 810 parts of 81 per cent sulfuric acid, 200 parts nitrobenzene and 50 parts benzene is heated to 80–85° C. in a jacketed nitration kettle equipped with an agitator and a reflux condenser. To the hot and well agitated mixture, whose temperature is controlled or regulated by means of cooling or heating with water or steam in the jacket as may be required, there is gradually and simultaneously added 1135 parts pulverized sodium nitrate of 96% purity, 1680 parts of 66° Be'. sulfuric acid and 950 parts benzene, at such a rate that the proportional parts of each substance are added in the same period of time. By the time that about one-fourth of the respective amounts of sodium nitrate, sulfuric acid and benzene have been added the temperature is gradually raised to about 95° C., and afterwards gradually to 105°–110° C. The addition of the benzene and of the sulfuric acid may be done from calibrated measuring tanks, and the addition of each so regulated as to correspond to the proportional rate of addition of the sodium nitrate. The desired temperature of the reaction mass is maintained by regulating the rate of addition of the sodium nitrate and by the cooling or heating means available. It usually requires about 2 to 3 hours to add the sodium nitrate. After all of the components have been added, the mixture is heated to 110°–115° C. for about one hour or until the nitration is completed. At this point, the hot reaction mixture is then allowed to settle at a temperature of 90–110° C., the lower layer of acid liquor drawn off, and the remaining nitrobenzene washed with water or dilute alkali, or both, and, if desired, subsequently distilled. An almost theoretical yield of distilled nitrobenzene, calculated on the benzene used, can be obtained.

The acid layer either before or after dilution, either hot or cold, as desired, may be extracted with a suitable solvent in order to recover the nitrobenzene in solution or suspension. The acid liquor may be allowed to cool and the sodium acid sulfate, which crystallizes out, separated by filtration, and the mother liquor may be fortified by the addition of oleum or it may be concentrated by evaporation and used to replace sulfuric acid in succeeding nitrations.

It will thus be noted that the present invention makes it possible to nitrate benzene and obtain nitrobenzene in excellent yields, and in an excellent state of purity, it being almost free from dinitrobenzene, by the use of solid nitrate and moderately strong sulfuric acid as the nitrating mixture; that the use of nitrobenzene as a diluent effects the speed of nitration and decreases the liability of explosion, promotes the formation of intimate and emulsified mixtures which minimize or prevent local action, and permits the reaction to be conducted at the initial stage of nitration at elevated temperatures; to control and maintain a constant or regulated temperature throughout the nitration not only by the previous addition of nitrobenzene, if so desired, to the reaction mixture but also by the rate at which the benzene, sulfuric acid and sodium nitrate are subsequently added, and by suitably regulating the cooling or heating effects on the jacket of the nitrating kettle to correspond to the rate of addition of these components; to effect a smooth nitration without evolution of large quantities of oxides of nitrogen since the sodium nitrate is readily dissolved and nitric acid is generated in a regular and constant manner under controllable conditions; to maintain and readily keep in solution throughout the process of nitration the sodium acid sulfate formed in the reaction, to avoid the hazards involved in handling nitric acid or mixed acids, and, finally to successfully effect an economic saving by substituting sodium nitrate for the more expensive nitric acid. It will be understood that other nitrates may be used in place of sodium nitrate.

We claim:

1. The process of nitrating benzene to form nitrobenzene which comprises the addition of sulfuric acid, benzene and sodium nitrate to a mixture of sulfuric acid, nitrobenzene and benzene.

2. The process of nitrating benzene to form nitrobenzene which comprises the gradual addition of sulfuric acid, benzene and sodium nitrate to a mixture of sulfuric acid, nitrobenzene and benzene heated to a temperature of about the boiling point of benzene.

3. The process of nitrating benzene to form nitrobenzene which comprises a simultaneous and gradual addition of sulfuric acid, benzene and sodium nitrate to a mixture of sulfuric acid, nitrobenzene and benzene maintained at a temperature between about the boiling point of benzene and about 115° C.

4. The process of nitrating benzene to form nitrobenzene which comprises a simultaneous and proportionate addition of concentrated sulfuric acid, benzene and sodium nitrate to an emulsified mixture of sulfuric acid of about 70 to 85 per cent strength, nitrobenzene and benzene at a temperature of about 80°-115° C., the total benzene and sodium nitrate used being approximately in equimolecular quantities, and the sulfuric acid in such an amount that the acidity of the reaction mixture is maintained at between about 70 and 85 per cent strength.

5. In the process of manufacturing nitrobenzene by the nitration of benzene by the addition of solid sodium nitrate to sulfuric acid in the presence of benzene, the step which comprises the addition of sodium nitrate to a sulfuric acid having a strength between about 70 and 85 per cent.

6. In the process of manufacturing nitrobenzene, the step which comprises the gradual and proportionate addition of sulfuric acid of 90 to 100 per cent strength, benzene and sodium nitrate to a well-stirred mixture of sulfuric acid of about 70 to 85 per cent strength, nitrobenzene and benzene at a temperature of about 80°-115° C., the total benzene and sodium nitrate used being approximately in equimolecular quantities, and the sulfuric acid in such an amount that the acidity of the reaction mixture is maintained at between about 70 and 85 per cent strength.

7. The process of manufacturing nitrobenzene which comprises the gradual and proportional addition of about 1135 parts sodium nitrate, about 1680 parts 66° Be'. sulfuric acid, and about 950 parts benzene to a mixture of about 810 parts of 81 per cent sulfuric acid, about 50 parts benzene and about 200 parts nitrobenzene at a temperature of about 80°-115° C.

8. The process of nitrating benzene to form nitrobenzene which comprises the gradual addition of sulfuric acid, sodium nitrate and benzene to a mixture of sulfuric acid and benzene heated to an initial temperature of about the boiling point of benzene and subsequently gradually raising the temperature to about 110°-115° C. as the nitrobenzene which is formed, increases in amount.

9. The process of nitrating benzene to form nitrobenzene which comprises the addition of sodium nitrate benzene and sulfuric acid of about 90-100 per cent strength to a mixture of benzene and a sulfuric acid of about 70-85 per cent strength, the total benzene and sodium nitrate used being approximately in equimolecular quantities, and the sulfuric acid in such amount that the acidity of the reaction mixture is maintained at between about 70 and 85 per cent strength.

10. In a process of making nitrobenzene by subjecting benzene to the action of a mixture of sulfuric acid and sodium nitrate, the step characterized by causing the nitration to occur in the presence of sulfuric acid of about 70 to 85 per cent strength.

11. In a process of making nitrobenzene by subjecting benzene to the action of a mixture of sulfuric acid and sodium nitrate, the steps characterized by causing the entire nitration to occur in the presence of sulfuric acid of about 70 to 85 per cent strength and at a temperature of about 80° to 115° C.

In testimony whereof we affix our signatures.

JOHN W. LIVINGSTON.
LUCAS P. KYRIDES.